United States Patent [19]
Narita

[11] Patent Number: 5,825,467
[45] Date of Patent: Oct. 20, 1998

[54] ORDER FORM FOR PHOTOGRAPHIC PRINTS, KEYBOARD, REPRINTING METHOD AND REORDERING METHOD

[75] Inventor: Toshihiko Narita, Kanagawa, Japan

[73] Assignee: Fuji Photo Film Co., Ltd., Kanagawa, Japan

[21] Appl. No.: 467,170

[22] Filed: Jun. 6, 1995

[30] Foreign Application Priority Data

Oct. 11, 1994 [JP] Japan ................................ 6-245395

[51] Int. Cl.⁶ ........................................................ G03B 27/52
[52] U.S. Cl. ........................................................ 355/40
[58] Field of Search ................................ 355/39, 40, 41, 355/38

[56] References Cited

U.S. PATENT DOCUMENTS

| | | | |
|---|---|---|---|
| 4,607,949 | 8/1986 | Hakamada et al. | 355/40 |
| 4,935,809 | 6/1990 | Hayashi et al. | 355/38 X |
| 5,508,783 | 4/1996 | Iwagaki et al. | 355/40 |
| 5,563,984 | 10/1996 | Tanibata | 355/40 X |

FOREIGN PATENT DOCUMENTS

| | | |
|---|---|---|
| 4306654 | 10/1992 | Japan . |
| 5-27406 | 2/1993 | Japan . |
| 5-45854 | 2/1993 | Japan . |
| 6-197304 | 7/1994 | Japan . |
| 7-64200 | 3/1995 | Japan . |

*Primary Examiner*—Fred L. Braun
*Attorney, Agent, or Firm*—Sughrue, Mion, Zinn, Macpeak & Seas, PLLC

[57] ABSTRACT

A system for ordering photographic prints including an order form, an index print, and a keyboard. The order form has writable frames for a user to write reprint information such as the number of requested reprints; the index print has images representing the various images to be ordered; and the keyboard has frame number input keys to select a particular image for reprinting. The order form, index print, and keyboard have corresponding layouts to facilitate identifying and selecting corresponding images, frames, and keys.

18 Claims, 10 Drawing Sheets

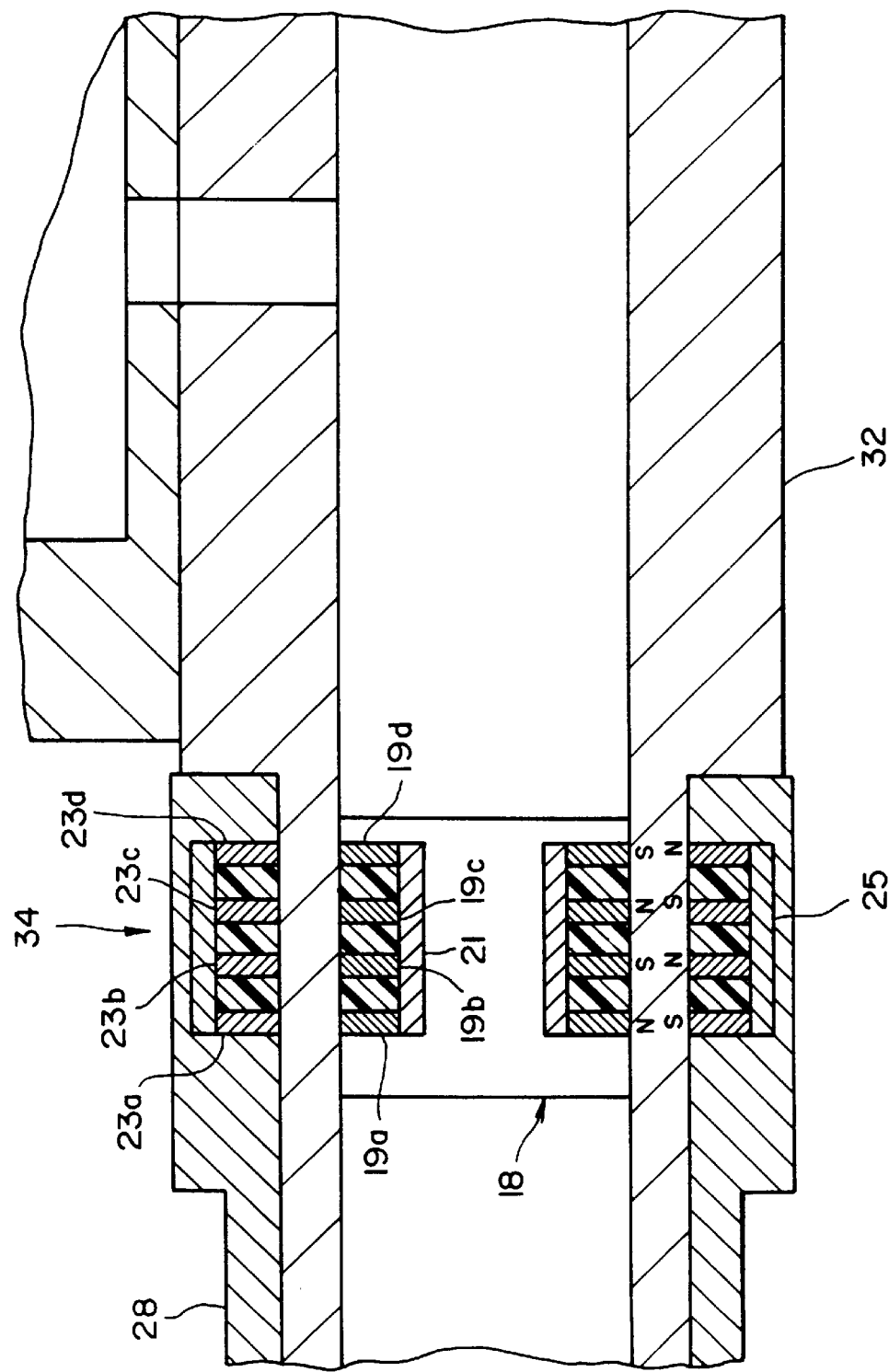

ORDER FORM FOR PHOTOGRAPHIC PRINTS, KEYBOARD, REPRINTING METHOD AND REORDERING METHOD

BACKGROUND OF THE INVENTION

1. Field of the Invention

The present invention relates to an order form used at a time of reordering photographic prints, a keyboard for inputting information for reprint, a reprinting method and a method of reordering photographic prints.

2. Description of the Related Art

Generally, a negative film for which shooting thereof by a camera has been completed, is brought to a DPE shop and simultaneous prints are requested ("DPE shop" refers to a place where a film is taken for processing). At a developing facility (a laboratory), the negative film is subject to developing processing, the developed image frames are successively positioned at a printing position, and exposure processing is carried out onto a photographic printing paper at a predetermined enlargement magnification. The photographic printing paper which has been simultaneously printed and the negative film are returned to the customer from the DPE shop.

In order to facilitate the customer's requesting of additional prints, as illustrated in FIG. 7, an index print 100, on which the images of all of the image frames recorded on the negative film are reduced and printed as positive images, is prepared and is given to the customer when the negative film is returned (Japanese Patent Application Laid-Open No. 5-27406). Because the index print 100 contains positive images, the contents of respective images 102 can be easily verified. Because frame numbers 104 are applied, it is easy to verify to which of the images 102 of the negative film each image 102 corresponds.

In the index print 100, in the case of a film for 24 frames for example, consecutive numbers 01 through 06 are applied as the frame numbers 104 to the image frames 102 lined from the upper left corner in FIG. 7 along the top first row. Next, numbers 07 through 12 are applied from the left along the second row which is under the top first row. In this way, numbers 13 through 18 are applied to the third row, and numbers 19 through 24 are applied to the fourth row.

In the case of an index print 106 for 12 frames, as shown in FIG. 8, for the frame numbers 104, numbers 01 through 03 are applied to the image frames 102 lined from the upper left corner in the drawing along the top first row, numbers 04 through 06 are applied to the second row, numbers 07 through 09 are applied to the third row, and numbers 10 through 12 are applied to the fourth row.

The customer views the respective images 102 of the index prints 100, 106 organized as described above, and verifies the images 102 for which reprinting is desired. Then, the customer enters the numbers of the images 102 for which reprinting is desired on an order form of a different style. At this time, the number of prints of the images 102 for which additional prints are desired, as well as the print size, such as standard, high vision, panorama, or the like, are also entered in the order form, and additional printing is requested at a DPE shop. At the developing facility, the frame numbers 104, the numbers of additional prints, and the print size information, which have been entered onto the order form, are inputted into an automatic printer by using a keyboard or the like. The designated negatives are set, and the designated number of prints is obtained.

However, when an index print such as that described above is used, entry of information regarding reprinting requires much trouble because the format of the index print and the format of the order form are different.

Further, as can be understood by comparing for example the index print 100 for 24 frames illustrated in FIG. 7 and the index print 106 for 12 frames illustrated in FIG. 8, there are often cases in which the frame numbers 104 of the images 102 corresponding to the same positions on the index prints 100, 106 do not match. Namely, with reference to the first vertical rows on the left sides of the figures, the frame numbers are 01, 07, 13, 19 in the index print 100 for 24 frames, whereas the frame numbers are 01, 04, 07, 10 in the index print 106 for 12 frames. From the second row on, there are no corresponding relationships.

Accordingly, when a customer uses, either together or alternately, the index prints 100, 106 which have different frame numbers, mistakes may be made in order form entry.

Further, at the developing facility, when the information written on the order form is inputted to the automatic printer at the keyboard, there is no connection whatsoever between the format of the index prints and the arrangement of the keys of the keyboard. Therefore, entry work is inefficient and requires much trouble. Moreover, mistakes may be made in the entry of the information.

SUMMARY OF THE INVENTION

In view of the aforementioned, a first object of the present invention is to provide an order form in which, when reprints are being ordered, there is no trouble in the entry of the reprint information and it is difficult for errors in entry to occur.

A second object of the present invention is to provide a keyboard in which work for entering information written on an order form into a printer at a developing facility can be carried out efficiently and with few errors.

A third object of the present invention is to provide a reprinting method in which reprinting can be carried out at a developing facility, efficiently and without incorrect operation, from in formation written on an order form.

A fourth object of the invention is to provide a method, involving use of an index print, an order form and a keyboard for inputting order-information, in which a reorder for photographic prints is conducted efficiently and without incorrect operation.

Other objects of the present invention will become clear from the following discussion.

The first aspect of the invention is an order form for photographic prints, said order form having frame outlines for writing of reprint information, wherein the frame outlines for writing of reprint information have the same format as or a similar format to index image frames of an index print.

The second aspect of the invention is a keyboard having frame number input keys which specify images recorded on an index print and which input commands to a printer to form reprints, wherein the frame number input keys have the same format as or a similar format to frame outlines, for writing of reprint information, of an order form for photographic prints.

The third aspect of the invention is a reprinting method comprising:

an order-taking step in which an order is taken by using an order form for photographic prints which has frame outlines for writing reprint information;

a sending step in which information of the order form for the photographic prints is sent to a printer by using a keyboard having frame number input keys which specify an image recorded on an index instructions for making reprints print and which input to a printer, the frame number input keys having the same format as or a similar format to the frame outlines, for writing of reprint information, of the order form for the photographic prints; and a reprinting step in which reprinting is effected in accordance with sent information.

The fourth aspect of the invention is a method of reordering photographic prints using:

an index print of a format arranged in order of numbers applied to respective images;

an order form in which frame outlines for writing reprint information, which frame outlines correspond to the respective images of said index print, are of the same format as or a similar format to said index print; and a keyboard in which frame number keys, which specify the respective images of said index print and which input commands to a printer to form reprints, are of the same format as or a similar format to said index print.

It will also be apparent from the following description that these aspects of the invention are extremely close, and thus are considered to be a united invention.

In the order form of the first aspect, the respective frame outlines correspond one-to-one in the same or similar arrangement to images disposed in a predetermined format on an index print. As a result, the respective images of the index print are viewed, and simultaneously or subsequently, information for reprinting can be entered easily and quickly into the frame outlines of the order form which correspond to the images. Further, mistakes with respect to the correspondence between the respective images and the respective frame outlines can be prevented.

In the keyboard of the second aspect, frame outlines arranged in a predetermined format on an order form and the frame number input keys of the keyboard correspond one-to-one in the same or similar arrangement in the same format or a similar (i.e., geometrically similar) format. Therefore, the information within the frame outlines of the order form is read, and the work for operating the frame number input keys corresponding to these frames can be effected easily and quickly. Further, because the information for reprinting entered in the order form can be inputted reliably to the printer, mistakes in ordering can be eliminated.

In the method of the third aspect, formats of an order form and a keyboard (and preferably an index print) are standardized. In the method of the fourth aspect, formats of these three articles are standardized. Accordingly, its frame outlines and its frame number input keys correspond, or its images, its frame outlines and its frame number input keys correspond. That is, the entire system can be standardized, so that mistakes can be prevented, and the flow of operation can be made smooth.

DESCRIPTION OF THE PREFERRED EMBODIMENTS (Description of the Index Print)

Figure 1:
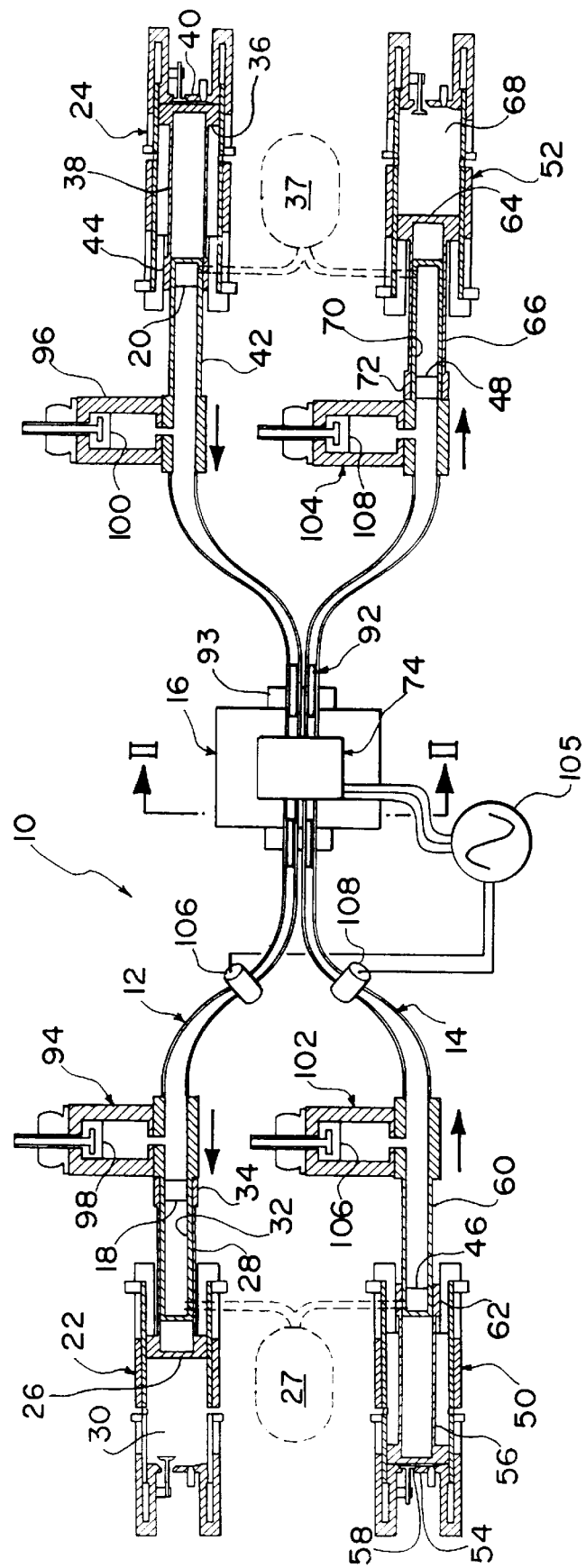
FIG. 1 is a front view illustrating an index print for 40 frames which can be preferably used in the present invention.

In FIG. 1, an index print which can be preferably used in the present invention is illustrated in its entirety. This index print 10 is a single sheet-like photographic printing paper which is elongated horizontally. Index frames (in the present index print, 40 index frames numbered 01 to 40), in which are printed images 12 corresponding to the image frames of a negative film, are printed at even intervals on the index print 10. The images 12 printed on the index print 10 are obtained by reducing images of high vision size frames (recorded at an aspect ratio of 16:9 and at a negative film frame size of, for example, 25×14 mm) of a negative film and printing the reduced images as positive images.

As to the format of the index print 10, the images 12 of the index frames are arranged so as to be spaced apart at fixed intervals vertically from No. 1 to No. 5 in order from the top of the starting side end portion at the left side end in FIG. 1, so as to form an index image frame row. Next, to the right of this row in the figure is an index image frame row in which image frames from No. 6 to No. 10 are arranged so as to be spaced apart at fixed intervals vertically. Namely, the image frame rows are arranged such that No. 6, which is the subsequent image frame after No. 5 of the lowermost level, is positioned at the topmost level of the vertical row which is next in the horizontal direction. No. 6 after the lowermost level No. 5 may be positioned at the lowermost level of the vertical row which is next in the horizontal direction, so that the numbers are set in a zig-zag arrangement in order towards the top. In this way, there are a total of 5 rows as counted in the vertical direction and 8 rows as counted in the horizontal direction. The numbers of the images 12 of the respective index frames are displayed in number display portions 14 at the images 12 of the index frames so as to correspond to the above-described arrangement of the index print 10, e.g., so that numbers 01 through 05 are applied in order from the top of the left side end portion.

As illustrated in FIG. 1, the number display portions 14 are formed by a white background being formed in the shape of a small rectangle in the lower left corner portion in the figure of each image 12, and the characters of the numbers being recorded therein.

The numbers displayed in the number display portions 14 of the images 12 of the index frames and the numbers of the image frames of the negative film correspond respectively. If the number of a number display portion 14 of an image 12 is specified, the image frame of the negative film which is the same as that image 12 can be specified.

Although unillustrated, information may be listed at the images 12 of the index print 10. Such information may include the aspect ratio at the time of negative film development and simultaneous printing, the aspect ratio being high vision, standard (aspect ratio 18:13), panorama (aspect ratio 36:13), or information regarding reasons why the image was not printed, such as blurring or unsatisfactory exposure, as well as other information.

The index print 10 is not only of a format in which 40 frames of the images 12 are printed as illustrated in FIG. 1.

Figure 4:
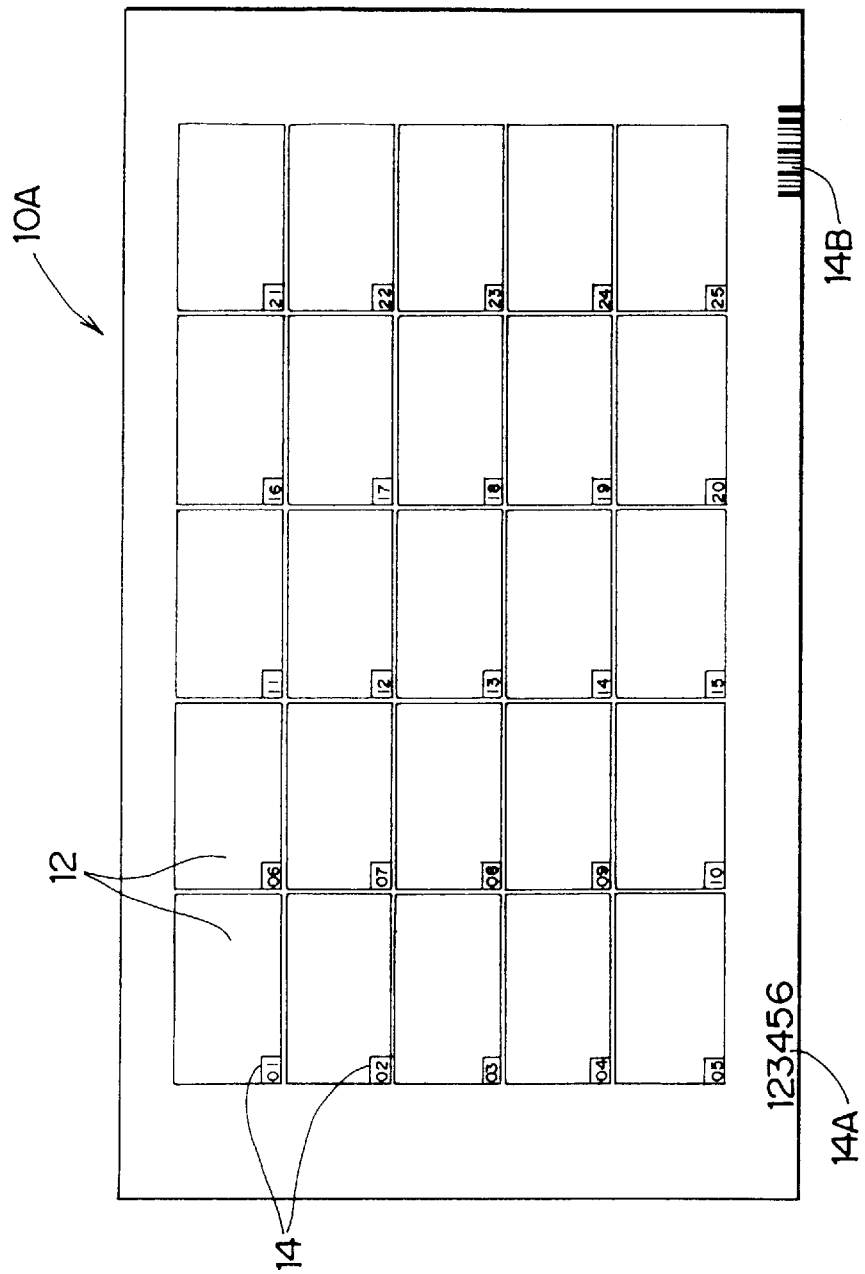
FIG. 4 is a front view illustrating an index print for 25 frames which can be preferably used in the present invention.

An index print 10A may be used in which 25 frames of the images 12 are printed as illustrated in FIG. 4.

In the 25-frame index print 10A, the arrangement of the numbers from 01 to 25 which are displayed in the number display portions 14 corresponds to the arrangement of the numbers from 01 to 25 of the number display portions 14 of the index print 10. In a case in which consecutive numbers are applied to the index print 10 in a vertical direction (transverse direction of the index print having a constant width) as described above, the arrangement of the numbers of the number display portions 14 does not change even if index prints 10 of various different numbers of frames are prepared (such as 15, 25 and 40 frames) in accordance with the number of photographed images on the film. In the figures, reference numeral 14A is a film identification number, and reference numeral 14B is a bar code for collation.

In the index print 10 illustrated in FIG. 1, the short sides of the images 12 of the index frames run parallel to a starting end side portion 110A at the left side end in the figure of the index print 10. However, an arrangement may be provided in which the long sides of the images 12 of the index frames are rotated 90 degrees from the state shown in the figure such that the long sides run parallel to the starting end side portion 110A.

Index image frames are recorded on the index print 10 in succession from the pulled-out leading end of an elongated recording paper (a printing paper) which is wound in roll-form. Accordingly, the starting end side portion 110A in FIG. 1 is the leading end or cut portion (i.e., a starting end) of the recording paper pulled out from the roll-shaped wound portion. As a result, the lengths of the recording papers used for the index print 10 in FIG. 1 and the index print 10A in FIG. 4 are respectively different. The widths of them are the same.

(Description of the Order Form)

Figure 2:
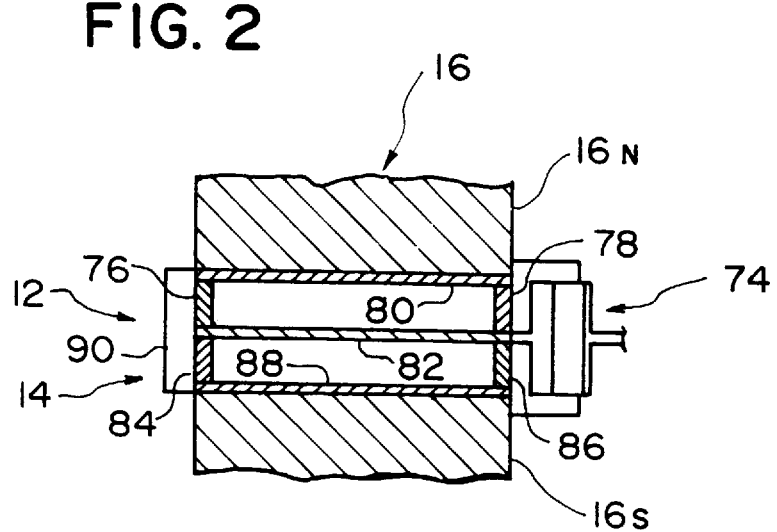
FIG. 2 is a front view illustrating an order form of the same format as the index print.
Figure 3A:
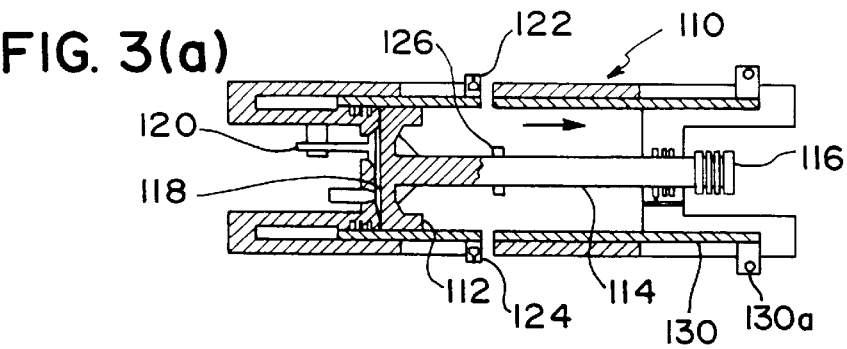
FIG. 3 is a schematic plan view illustrating a keyboard having frame number input keys of the same format as the index print.
Figure 3B:
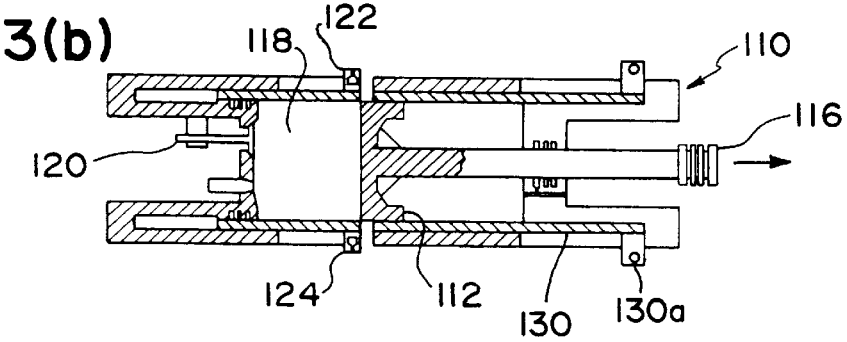
Figure 3C:
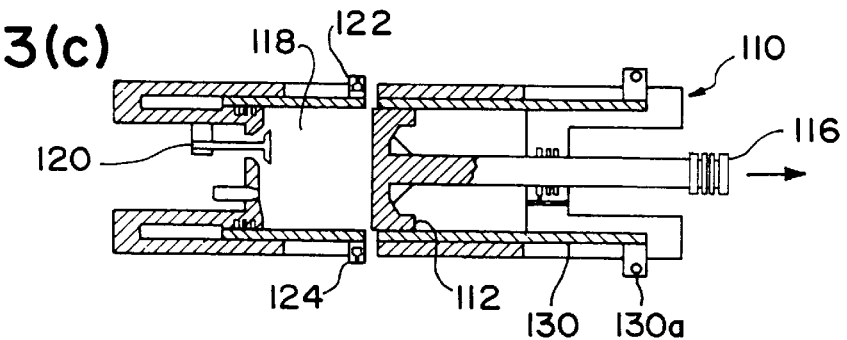
Figure 3D:
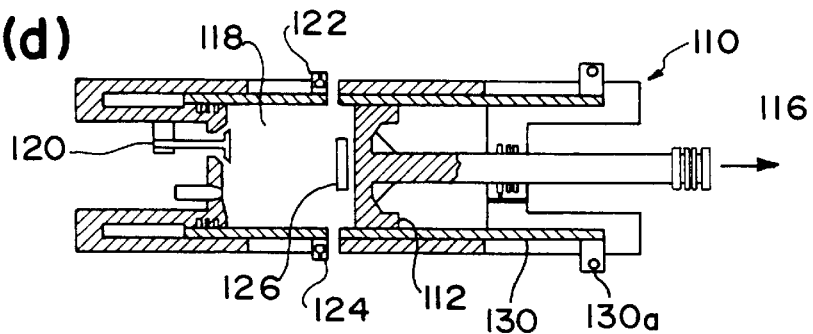
Figure 3E:
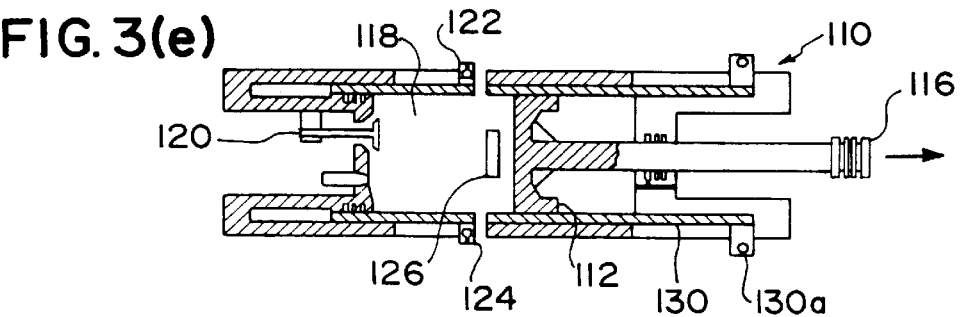
Figure 3F:
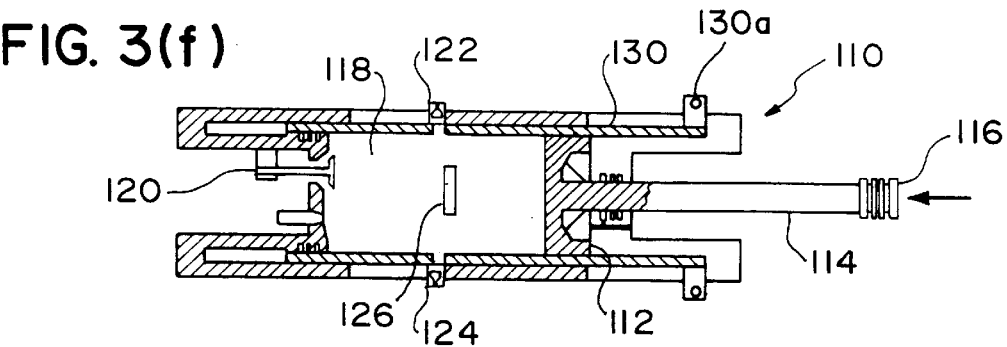
Figure 3G:
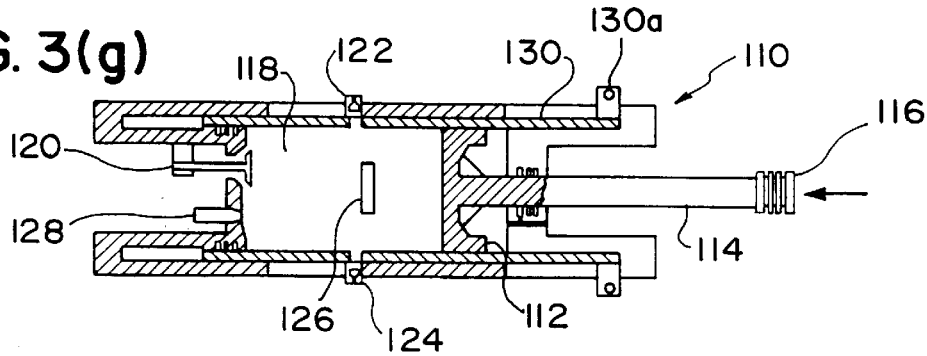
Figure 3H:
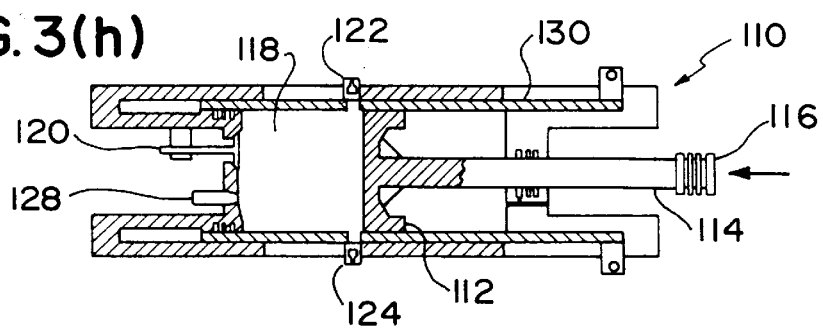
Figure 3I:
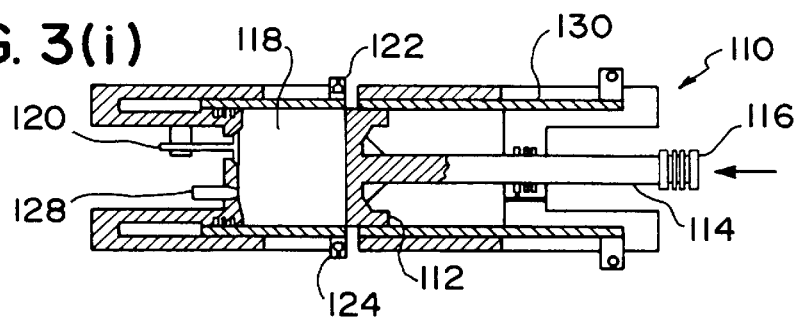
Figure 3J:
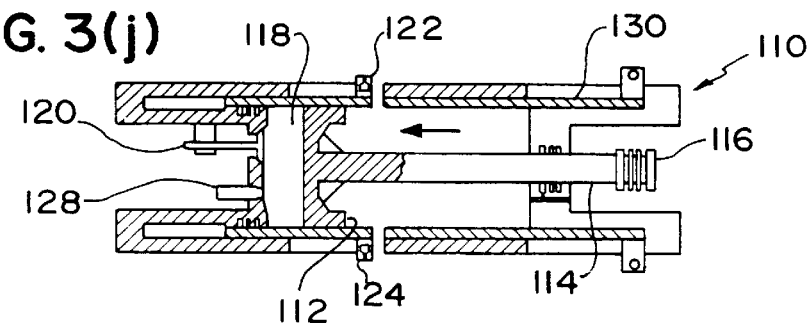

In FIG. 2, an order form corresponding to the above-described index print and according to the present invention is illustrated in its entirety. An order form 16 is used when a customer views the index print 10, 10A and orders reprints. In the present embodiment, the order form 16 is formed of semi-transparent, flexible paper and is of the same format as the index print 10.

Namely, 40 frame outlines 18 corresponding congruently to the images 12 of the 40 frames of the index print 10 are displayed on the order form 16. A frame-shaped display portion 20 having the same outline as the number display portion 14 of the index print 10 is provided in the lower left corner portion of each of the frame outlines 18 in FIG. 2. The same number as the number displayed in the corresponding number display portion 14 is displayed in the frame-shaped display portion 20.

A small, rectangular frame portion 21 is provided in the lower right corner portion of each frame outline 18. The print size is displayed in the frame portion 21. The print size is displayed by symbols of H for high vision size, L for standard size, and P for panorama size. Images are printed onto a photographic printing paper at image sizes of, for example, 158×89 mm for high vision size, 127×89 mm for standard size, and 254×89 mm for panorama size.

The number of additional prints to be ordered of the image 12 corresponding to a frame outline 18 can be entered in the central portion of the frame outline 18.

An X mark is applied to frame outlines 18 corresponding to image frames which were not printed during negative development and simultaneous printing for reasons such as blurring, unsatisfactory exposure or the like, so as to indicate that the image frame was not printed. This indication may be made at the developing facility during simultaneous printing.

In a case in which reprints are ordered on the basis of a 25-frame index print 10A such as that illustrated in FIG. 4, the order form 16 for 40 frames illustrated in FIG. 2 can be used as well. In this case, the frame outlines 18 corresponding to the images 12 from the 26th frame to the 40th frame are also marked with an X to indicate that reprints are not to be made. A space for entering an indication that an image is not to be reprinted may be provided within each frame outline 18. Further, the indication that an image is not to be reprinted is not limited to an X-mark, and other various indications such as indications by colors may be used.

In the present embodiment, the format of the index print 10 and the order form 16 are the same. Therefore, the order form 16 may be superposed on the index print 10 such that the underlying index print 10 can be viewed through the semi-transparent order form 16. When the index print 10 and the order form 16 are used in this way, necessary information such as the number of additional prints to be ordered, the print size and the like can be entered into the frame outlines 18 while the corresponding images 12, which are disposed beneath and have the same numbers as the frame outlines 18, are viewed through the order form 16. Accordingly, mistakes in ordering in which the order for an image 12 of a given number is entered incorrectly into the frame outline 18 of another number can be eliminated. Further, the entry work can be carried out more rapidly. The order form 16 is not limited to the same format as the index print 10, and an order form 16 having a format similar to that of the index print 10 may be used. In this case, the images 12 and the frame outlines 18 of the same numbers are in the same positions of the arrangements of these similar formats, and one-to-one correspondences are established between the respective images 12 and frame outlines 18. As a result, while viewing a certain image 12 on the index print 10, the necessary information can be entered into the frame outline 18 of the order form 16 whose position in the arrangement of the format corresponds to that image 12. Therefore, entry can be carried out quickly and reliably, and mistakes in ordering can be eliminated. Note that the film identification number 14A and the bar code for collation 14B are applied to the order form 16 as well.

Because the order form 16 structured as described above has a set format, the information entered thereon can be read by an optical reader. Accordingly, when an automatic printer equipped with an optical reader is used, the order form 16 is placed at the optical reader, the instructions thereof are inputted to the automatic printer, and reprints can be made in accordance with the instructions.

The instructions of the order form 16 of the present embodiment can also be inputted to the automatic printer by using a keyboard.

(Description of the Keyboard)

A keyboard corresponding to the order form and according to the present invention is illustrated in FIG. 3. A keyboard 22 is used to input necessary instructions to the automatic printer illustrated in FIGS. 5 and 6 which automatically forms reprints from negative films.

Figure 5:
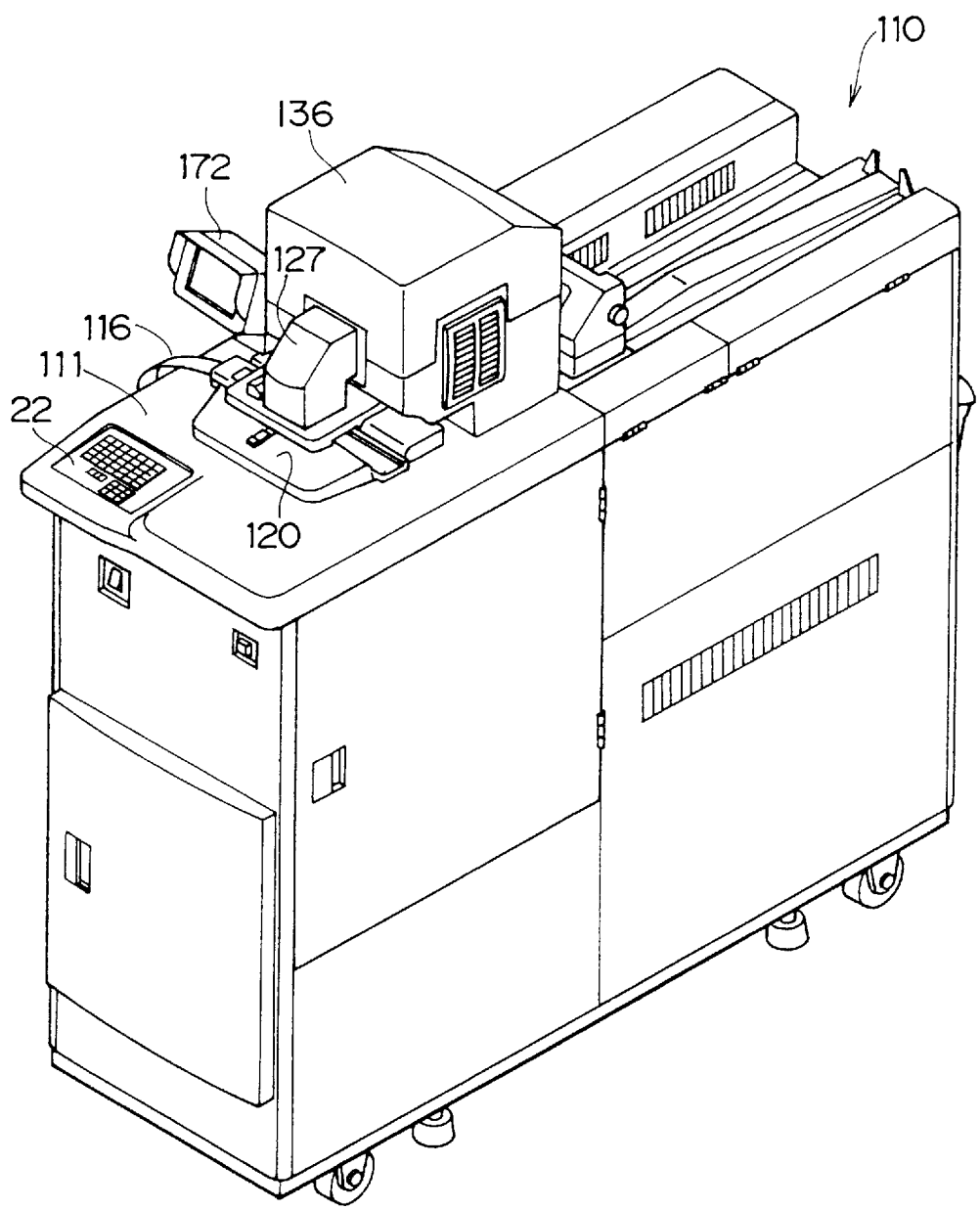
FIG. 5 is a perspective view illustrating an automatic printer in which the present invention is used.
Figure 6:
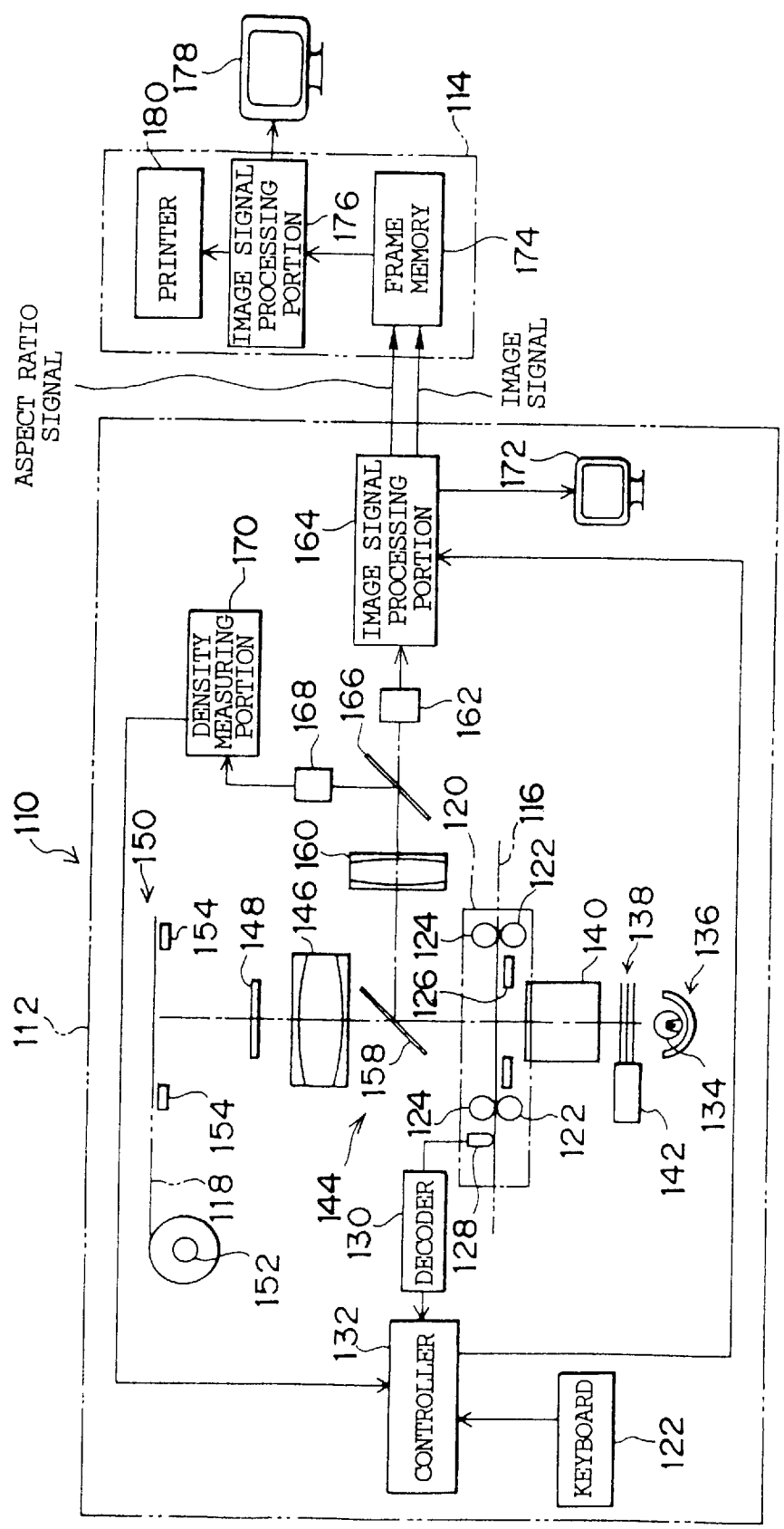
FIG. 6 is a schematic structural view of the automatic printer in which the present invention is used.
Figure 7:
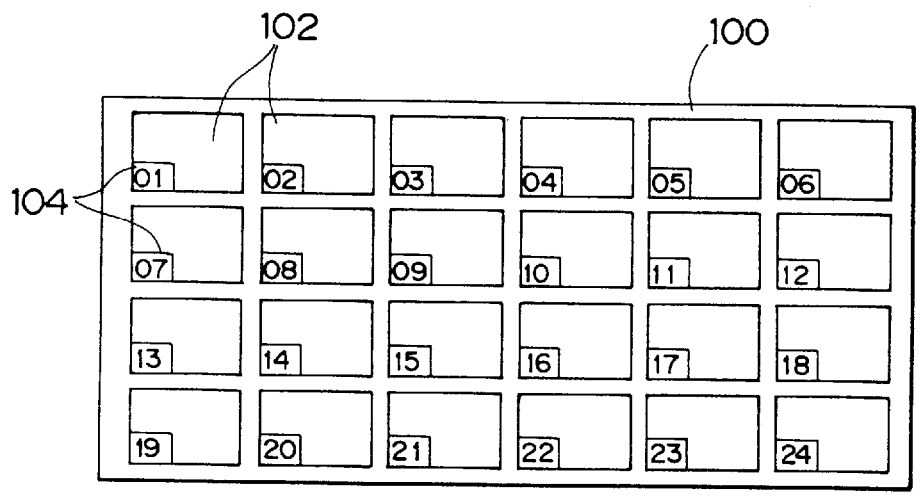
FIG. 7 is a front view illustrating a conventional index print for 24 frames.
Figure 8:
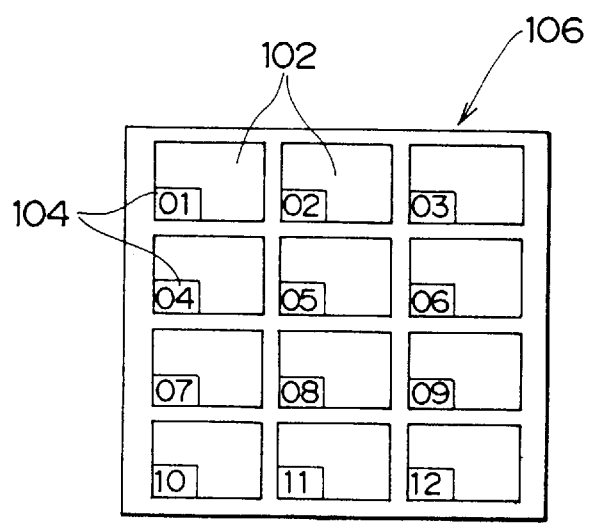
FIG. 8 is a front view illustrating a conventional index print for 12 frames.

As illustrated in FIG. 5, a work table 111 is disposed at the top portion of an automatic printer 110. The keyboard 22 is disposed at the work table 111. Further, a light source portion 136 and a diffusing box 127, which diffuses the light from the light source portion 136 and bends the printing optical axis approximately 90 degrees, are disposed at the rear side (the right side in FIG. 5) of the work table 111. The optical axis which has been bent is orthogonal to the work table 111, and passes through a negative film 116 on a negative carrier 120 set on the top surface of the work table 111. A CRT 172 is disposed at the work table 111. As illustrated in FIG. 6, at a processor section of the automatic printer 110, a photographic printing paper 118, on which images of designated frames of the negative film 116 have been printed at a printer section 112, is subjected to developing processing by being immersed in developing solution, fixing solution, and washing water successively. Thereafter, the photographic printing paper 118 is dried at a drying section, is cut into image frames, and is discharged.

As shown in FIG. 6, the printer section 112 is equipped with the negative carrier 120. A conveying roller 122 driven by an unillustrated drive source and a press roller 124 opposing the conveying roller 122 are provided at the negative carrier so as to form a conveying path for the negative film 116. A printing opening 126 is formed at the conveying path. The negative film 116 is nipped by the conveying roller 122 and the press roller 124 and is conveyed thereby. The image frames of the negative film 116 for which reprinting is designated by input operation of the keyboard 22 which will be described later, are positioned at the printing opening 126.

The negative carrier 120 is equipped with a reading head 128 which reads magnetic data recorded on the negative film 116 which is being conveyed. The reading head 128 is connected to a controller 132 via a decoder 130. In this way, the controller 132 can take in magnetic data recorded on the negative film 116. Examples of magnetic data include the date of photographing, the exposure conditions, the aspect ratios of the respective images, and the like.

The light source portion 136 which is equipped with a light source 134 is disposed beneath the printing opening 126 of the negative carrier 120. A light beam illuminated from the light source 134 reaches the negative film 116 set at the negative carrier 120 via a filter portion 138 and a diffusion tube 140. The filter portion 138 is formed of three filters of cyan, magenta and yellow. Due to the driving of a filter driving portion 142, the respective filters move onto and withdraw from the optical axis. An optical system 144 is disposed above the negative carrier 120. The optical system 144 is provided with a lens 146 and a shutter 148 on the optical axis of the light beam. The light beam which passes through the negative film 116 passes through the lens 146 and the shutter 148 so as to form an image of the negative film 116 on the photographic printing paper 118 set at an exposure room 150.

The photographic printing paper 118 is loaded so as to be wound in a layered form on a reel 152, and is pulled out from the reel 152 and set at the exposure room 150. The exposure room 150 is provided with a variable mask 154. The photographic printing paper 118 set at the exposure room 150 is masked in accordance with the image size by the variable mask 154 and is exposed. The image size is determined either by designation of the aspect ratio for each image recorded on the negative film 112 or by designation of the aspect ratio inputted to the controller 132 by key operation of an operator from the keyboard 22.

The photographic printing paper 118 exposed at the printer section 112 is conveyed to the processor section where it is subject to developing processing and then discharged.

Further, the optical system 144 is provided with a half mirror 158 between the lens 146 and the negative carrier 120. The direction of a portion of the light beam is changed by the half mirror 158, and reaches a CCD 162 which is an image pickup element via the lens 160. An image signal processing portion 164 is connected to the CCD 162. The image recorded on the negative film 116 is converted by the light beam into an electric signal (digital signal).

A half mirror 166 is provided between the lens 160 and the CCD 162 so that a portion of the light beam passing through the negative film 116 reaches a density measuring device 168. A density measuring portion 170 is connected to the density measuring device 168 and measures the density of the image of the negative film 116. The density measuring portion 170 is connected to the controller 132. On the basis of the measured value from the density measuring portion 170 or on the basis of data key-inputted by an operator, the controller 132 sets exposure correction values for exposure.

The image signal processing portion 164 is connected to the controller 132. The image signal processing portion 164 effects various types of image processing in accordance with the signals from the controller 132, and projects the processed image to the CRT 172. The image projected to the CRT 172 corresponds to the image which is to actually be printed onto the photographic printing paper 118. The operator can proceed with the printing work while viewing the CRT 172.

An index printer 114, which is used when prints are made simultaneously with film development, is connected to the automatic printer 110. A digital signal for each image frame of the negative film 116 from the image signal processing portion 164 of the automatic printer 110 and a designated aspect ratio for each image frame are inputted to the index printer 114. These data are stored in a frame memory 174 for each image frame.

The digital signal outputted to the index printer 114 from the automatic printer 110 is a signal before processing in accordance with the aspect ratio has been effected at the automatic printer 110 or before trimming processing has been effected. Therefore, the contents of the image stored on the negative film 116 are outputted as they are as the image signal. Further, the contents of trimming or the contents of processing in accordance with the designated aspect ratio for each image are outputted separately as an aspect ratio signal. The frame memory 174 stores the image signal and the aspect ratio signal for each image separately.

An image signal processing portion 176 is connected to the frame memory 174. The image signal processing portion 176 carries out synthesizing-processing of the image signal and aspect ratio signal stored in the frame memory, outputs the synthesized signal to a CRT 178 so that an image corresponding to the synthesized signal is displayed on the screen of the CRT 178, and outputs the synthesized signal to a printer section 180. At the printer section 180, an index print 10 corresponding to the signal outputted from the image signal processing portion 176 is formed by, for example, a printing method such as a sublimated dye heat transfer method in which yellow, cyan, and magenta dyes are vaporized by heat and transferred to a recording paper. The index print 10 is formed as illustrated in FIG. 1 which was described previously. Further, in addition to the above described method, other recording methods are applicable for recording the images of the index print, such as printing the images onto the photographic printing paper 118, per se, for photographic prints.

As illustrated in FIG. 3, frame number input keys 24 are provided on the keyboard 22. The frame number input keys 24 are formed in the same format as the index print 10 and the order form 16. Namely, the frame number input keys 24 corresponding to the images 12 numbered 01 through 05 are disposed in a vertical row at the left side end portion in the figure, and the frame number input keys 24 corresponding to the images 12 numbered 06 through 10 are disposed in a vertical row at the side of the previous row. In this way, the keys 24 are arranged in 5 rows as counted in the vertical direction and 8 rows as counted in the horizontal direction. The number corresponding to the key 24 is displayed on a display portion 26 in the center of the key 24. When a key 24 is pressed by the operator, a command is inputted to the automatic printer to reprint the image 12 of the number corresponding to that key 24. It is also possible for commands to be inputted such that a key 24 is pressed a number of times equal to the number of reprints to be formed.

Number-of-prints input keys 28 are provided at the keyboard 22. The number-of-prints input keys 28 comprise number keys 30 from 0 to 9 and an input key 32. The number of reprints is set by the number keys 30, and the set number is inputted by the input key 32.

Size changing keys 34 are provided at the keyboard 22. The size changing keys 34 are used when the print size at the time of simultaneous printing is to be changed to another size. The size changing keys 34 include three keys: a standard size key 34A, a high vision size key 34B, and a panorama size key 34C. By pushing the size changing keys 34A, 34B, 34C selectively, the print size of the reprint is inputted.

The keyboard 22 having the aforementioned structure can be used in combination with the above-described order form 16. Namely, the semi-transparent, flexible order form 16 is placed on the frame number input keys 24 so that the numbers of the respective frame outlines 18 and the numbers of the respective keys match. The frame outlines 18 of the order form 16 in which designations for reprints are written are pushed so that the respective keys 24 positioned directly beneath are pushed. At this time, the number of reprints may be designated by pushing the key 24 corresponding to the image a number of times equal to the number of reprints ordered. Alternatively, the number of reprints may be inputted by using the number-of-prints input keys 28. To this end, through holes may be formed in the frame outlines 18 of the order form 16.

When the frame number input keys 24 are operated and input is carried out in this way, the operator views the respective frame outlines 18 of the order form 16, and input can be carried out by merely pushing the frame outlines 18. Therefore, the input operation is simple and quick. Further, after the information displayed in a frame outline 18 has been read, no time is required to search for the corresponding frame number input key 24. Accordingly, the time required for operation can be reduced by that much, and operation can be carried out quickly. Further, operation can be effected reliably without there being erroneous operation in locating the corresponding key 24. Work efficiency can be improved and order mistakes can be eliminated especially in cases in which work for reprinting from many negatives is carried out.

The order form 16 may be used in a state in which the order form 16 is not superposed on the frame number input keys 24. In this case, the information read from the frame outlines 18 of the order form 16 may be inputted by the operator searching for, pushing and operating the corresponding key 24 of the frame number input keys which have a similar relation to the frame outlines 18. Here, a particular frame outline 18 and the key 24 corresponding thereto are arranged in the same positions of similar formats. Therefore, it is easy to search for and locate the appropriate key 24, and faulty operation can be eliminated. Accordingly, work efficiency can be improved and order mistakes can be eliminated, which is particularly effective in cases in which work for reprinting from many negatives is carried out.

In a case in which the print size of the reprint is to be changed, the desired size is designated by the size changing keys 34. In this way, if the information regarding the reprint is inputted to the automatic printer, thereafter, the automatic printer can form the reprints in accordance with the commands.

In a case in which the sizes of the images of an index print, an order form, and a keyboard are similar, it is possible to enlarge or reduce only the vertical dimensions or only the horizontal dimensions of the images, or to enlarge or reduce the vertical dimensions and the horizontal dimensions at different magnifications. In this way, even in cases in which the shapes cannot strictly be called similar, if these shapes result in the effects of the present invention, the shapes must be considered to be similar.

What is claimed is:

1. An order form for photographic prints, said order form having writable frames for containing written reprint information, said writable frames having a format which corresponds to the format of index image frames of an index print so that a particular writable frame can be easily located based on the location of a corresponding index image frame.

2. An order form for photographic prints according to claim 1, wherein said index print has:

(a) a thin recording medium for recording images; and (b) a plurality of index image frame rows in which index image frames, which are recorded on said recording medium and to which consecutive numbers are applied, are arranged in a direction along a starting end of said recording medium.

3. An order form for photographic prints according to claim 2, wherein said index image frame rows are arranged in a vertical direction corresponding to the transverse direction of said recording medium.

4. An order form for photographic prints according to claim 3, wherein said order form is the same size as said index print and is semi-transparent and flexible.

5. An order form for photographic prints according to claim 1, wherein said order form is semitransparent and of a similar format to said index image frames of said index print, so that said order form can be superposed on top of said index print allowing said writable frames to be superposed on top of corresponding index image frames of said index print.

6. A keyboard having frame number input keys which specify images recorded on an index print and which input commands to a printer to form reprints, wherein the arrangement of the frame number input keys corresponds to the arrangement of writable frames of an order form for ordering photographic prints so that a particular input key can be easily located based on the location of a corresponding writable frame.

7. A keyboard according to claim 6, wherein the prints has the frame outlines for writing of reprint information which have the same format as or a arrangement of writable frames on said order form and the arrangement of input keys on said keyboard also correspond to the arrangement of index image frames of the index print.

8. A keyboard according to claim 7, wherein the index print comprises:

(a) a thin recording medium for recording images; and (b) a plurality of index image frame rows in which index image frames, which are recorded on said recording medium and to which consecutive numbers are applied, are arranged in a direction along a starting end of said recording medium.

9. A keyboard according to claim 8, wherein said index image frame rows are arranged in a vertical direction corresponding to the transverse direction of said recording medium.

10. A reprinting method comprising:

an order-taking step in which an order is taken by using an order form for photographic prints, said order form having writable frames for containing written reprint information;

a sending step in which information of the order form for the photographic prints is sent to a printer by using a keyboard having frame number input keys which specify an image recorded on an index print and which input to a printer instructions for making reprints, the frame number input keys having a format which corresponds to the format of the writable frames; and a reprinting step in which reprinting is effected in accordance with sent information.

11. A reprinting method according to claim 10, wherein the writable frames of the order form are arranged in a format which corresponds to the format of index frames of the index print.

12. A reprinting method according to claim 11, wherein the index print comprises:

(a) a thin recording medium for recording images; and (b) a plurality of index image frame rows in which index image frames, which are recorded on said recording medium and to which consecutive numbers are applied, are arranged in a direction along a starting end of said recording medium.

13. A reprinting method according to claim 12, wherein said index image frame rows are arranged in a vertical direction corresponding to the transverse direction of said recording medium.

14. A reprinting method according to claim 11, wherein the format of the order form and the format of the keyboard are the same, and the order form is superposed on the keyboard to facilitate the selection of appropriate keys.

15. A method of reordering photographic prints using:

an index print of a format arranged in order of numbers applied to respective images;

an order form having writable frames for containing written reprint information, wherein said writable frames correspond to the respective images of said index print and have a format which corresponds to the format of said images on said index print; and a keyboard in which frame number keys, which specify the respective images of said index print and which input commands to a printer to form reprints, are of a corresponding format to the format of said index print to thereby facilitate selection and identification of particular frames, frame number keys, and images.

16. A method according to claim 15, wherein the format of said order form and the format of said keyboard are the same, and said order form is used in a state of being superposed on said keyboard.

17. A method according to claim 15, wherein said index print includes:

(a) a thin recording medium for recording images; and (b) a plurality of index image frame rows in which index image frames, which are recorded on said recording medium and to which consecutive numbers are applied, are arranged in a direction along a starting end of said recording medium.

18. A method according to claim 17, wherein said index image frame rows are arranged in a vertical direction corresponding to the transverse direction of said recording medium.

* * * * *